O. BODENSTEIN.
Ornamentation of Fire-Arms.
No. 8,964. Reissued Nov. 11, 1879.
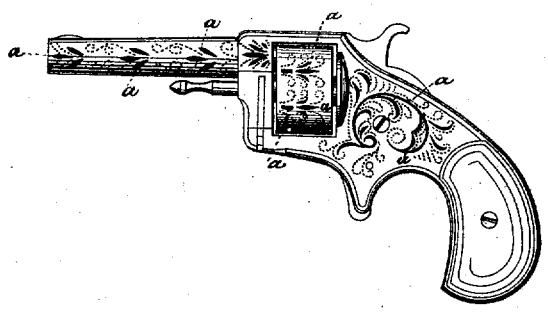
Witnesses:
Henry Barrett
James C. Mowin
Inventor:
Otto Bodenstein
N. PETERS, PHOTO-LITHOGRAPHER, WASHINGTON, D. C.

UNITED STATES PATENT OFFICE.

OTTO BODENSTEIN, OF NEW YORK, N. Y.

IMPROVEMENT IN ORNAMENTATION OF FIRE-ARMS.

Specification forming part of Letters Patent No. 210,446, dated December 3, 1878; Reissue No. 8,964, dated November 11, 1879; application filed June 25, 1879.

*To all whom it may concern:*

Be it known that I, OTTO BODENSTEIN, of the city, county, and State of New York, have invented a new and useful Improvement for the Ornamentation of Revolving Pistols and other Description of Fire-Arms; and I hereby declare the following to be a full, clear, and exact description of the same, reference being had to the accompanying drawings, forming part of this specification, and to the letters of reference marked thereon.

The drawing represents a side elevation of a revolving pistol (or a many-chambered fire-arm) ornamented in the manner of my improvement, in which the letters *a* designate the engraved figures, in which is placed the coloring (or colored) substance for ornamentation.

The object of this invention is, primarily, to relieve a revolving pistol and other description of fire-arms when engraved with any description of figures from their usual monotonous appearance, and to present a pleasing contrast of colors, the ornamentation to be inexpensive, expeditiously and simply done, so that it may be applied to the cheaper description of revolving pistols as well as to the more costly description of fire-arms; and, secondly, for the purpose of preserving the engraved figures made thereon from rust by moisture.

My invention consists in applying into or on engraved, cut, or struck-in figures made on revolving pistols or other description of fire-arms a coloring (or colored) substance, and which coloring substance may be of sufficient quantity to fill said figures even with the general surface of the parts so ornamented, or it may be applied in such quantities as only to cover the surfaces of the cuts so made; but I prefer the cuts to be filled, or nearly so.

The mode of applying the coloring (or colored) substance to the figures made as described is preferably done in the following manner, viz: Remove all grease or dirt from the parts to be ornamented; then wash with alcohol or similar fluid substance, and when dry apply the coloring substance, preferably with a brush, to the figures to be ornamented, and then immediately remove the surplus coloring from such parts of the general surface to which it has adhered, leaving that contained within the figures designed to be ornamented. This part of the operation is best performed by drawing over the surface where the color has been applied the edge of a paper card, which will remove the coloring substance from off the general surface and pass over that portion of it contained within the figures. The article is then set aside until dry, after which the color may be applied again as often as desirable, and when dry it may be polished by rubbing with a chamois-skin or by other means; but I do not confine myself to any special manner of applying the coloring substance into the figures made as described.

What I claim, and desire to secure by Letters Patent, is—

The ornamentation of revolving pistols and other description of fire-arms by the application of a coloring (or colored) substance into or on engraved, cut, or struck-in figures made thereon, substantially as described, and for the purposes as set forth.

OTTO BODENSTEIN.

Witnesses:
HENRY BARRETT,
JAMES C. MERWIN.